Patented Mar. 17, 1942

2,276,922

UNITED STATES PATENT OFFICE 2,276,922

PURIFICATION OF CYCLOPROPANE

Morton A. Buchman, Cleveland Heights, and Amos G. Horney, East Cleveland, Ohio, assignors, by mesne assignments, to Air Reduction Company, Incorporated, a corporation of New York No Drawing. Application April 26, 1939, Serial No. 270,226

6 Claims. (Cl. 260—666)

This invention relates to the preparation of cyclopropane and is more particularly concerned with a new and improved method for purifying cyclopropane.

Since one main use of cyclopropane is as an anesthetic, it is important that it should be substantially free from contaminating substances such as certain halogen-containing and unsaturated compounds. When cyclopropane is generated from 1-3-dichloropropane, 1-3-dibromopropane, 1-chloro-3-iodopropane, 1-bromo-3-iodopropane or 1-bromo-3-chloropropane, or from two or more of these substances, undesirable impurities which may be present include partially dehalogenated derivatives of these compounds and unsaturated compounds obtained by complete dehalogenation of these compounds. Examples of such impurities are propene, allene, allyl halides, and 1-halogen propenes. It is difficult to separate some of these impurities from cyclopropane and, accordingly, it is one of the objects of the present invention to provide a purification process which will insure the removal of all such substances from cyclopropane. The close proximity of the boiling points of some of these impurities to that of cyclopropane prevents satisfactory separation by fractional distillation and, furthermore, most substances which react with some of these impurities also react with cyclopropane and hence such impurities can not be removed from cyclopropane by ordinary chemical methods.

According to the present invention crude cyclopropane is freed from the foregoing impurities in the following manner.

The unsaturated compounds are first removed from the crude cyclopropane by treating it with a dilute solution of a substance which reacts rapidly with the unsaturated impurities and which reacts slowly or not at all with the cyclopropane. Hypochlorous acid is a preferred substance for this purpose. Hypobromous acid, hypoiodous acid, potassium permanganate and certain other substances may be used in dilute solutions but are not preferred because they react too rapidly with cyclopropane with resultant loss thereof and are too expensive for commercial use.

The crude cyclopropane may, conveniently, be treated with such a substance, for example a hypochlorous acid solution, by being passed up thru a scrubbing tower in which the solution is flowing downwardly. A hypochlorous acid solution suitable for this purpose may be made by passing chlorine into a 5% aqueous solution of sodium hydroxide until the solution becomes acid or is saturated with chlorine. While this solution is being circulated down thru the scrubbing tower and in contact with the upward flow of the cyclopropane, it is preferable to feed chlorine continuously into the solution in such amounts that chlorine is always present in slight excess in the solution, as is shown by the presence of chlorine in the cyclopropane leaving the scrubber.

The step of treating cyclopropane with the hypochlorous acid solution results in saturating or chlorinating all the unsaturated compounds and putting them into a condition which permits their removal from the cyclopropane in the scrubber or subsequently.

The chlorine present in the thus treated cyclopropane may be removed by treating the latter with a substance such as an alkali which will react with the chlorine and not with the cyclopropane. For example, an alkaline solution may be passed down through a scrubbing tower through which the cyclopropane is rising.

When the thus treated cyclopropane contains appreciable amounts of high boiling compounds, such as halogen propenes or halogen propanes, the amounts of such compounds may be reduced by passing the cyclopropane thru cooling coils which are maintained at a temperature somewhat above its boiling point, for example, between about −30° C. and about −25° C. Then the cyclopropane may be passed thru charcoal, which is preferably activated, where all remaining halogen-bearing compounds are removed.

Then the cyclopropane is dried, liquefied and distilled. The final distillation removes any impurities not removed by the previous treatments, such as propane, "permanent" gases, and higher boiling substances which were not condensed by the cooling coil. When the use of the cooling coil, or the charcoal, or both is dispensed with, the final distillation removes the impurities which those steps would have removed. However, it is preferable to use those steps for less cyclopropane is lost than when those steps are omitted.

The cyclopropane obtained from the final distillation step is substantially free from the foregoing impurities.

Having thus described the invention so that those skilled in the art may be able to practice the same, we state that what we desire to secure by Letters Patent is defined in what is claimed.

What we claim is:

1. In the commercial purification of cyclopropane, the step of treating cyclopropane contaminated with impurities in the form of unsaturated compounds with a hypochlorous acid solution to remove such impurities therefrom.

2. In the commercial purification of cyclopropane the steps of treating cyclopropane contaminated with impurities in the form of unsaturated compounds with a hypochlorous acid solution containing a slight excess of chlorine, and removing chlorine from the thus treated cyclopropane.

3. In the commercial purification of cyclopropane the steps of treating cyclopropane contaminated with impurities in the form of unsaturated compounds with a hypochlorous acid solution containing a slight excess of chlorine, and removing chlorine from the thus treated cyclopropane by treating the latter with an alkali.

4. The process of purifying cyclopropane commercially which includes the steps of treating cyclopropane contaminated with impurities in the form of unsaturated compounds with a hypochlorous acid solution containing a slight excess of chlorine, removing the excess chlorine from the thus treated cyclopropane by treating the latter with an alkaline solution, cooling the thus treated cyclopropane to remove higher boiling substances and drying, liquefying and distilling the thus treated cyclopropane.

5. The process of purifying cyclopropane commercially which includes the steps of treating cyclopropane contaminated with impurities in the form of unsaturated compounds with a hypochlorous acid solution containing a slight excess of chlorine, removing the chlorine from the thus treated cyclopropane by treating the latter with an alkaline solution, passing the cyclopropane thru charcoal, drying and liquefying the thus treated cyclopropane and distilling it.

6. The process of purifying cyclopropane commercially which includes the steps of treating cyclopropane contaminated with impurities in the form of unsaturated compounds with a hypochlorous acid solution containing a slight excess of chlorine, removing the chlorine from the thus treated cyclopropane by treating the latter with an alkaline solution, cooling the thus treated cyclopropane to remove higher boiling substances, passing the cyclopropane thru charcoal, drying and liquefying the thus treated cyclopropane and distilling it.

MORTON A. BUCHMAN.
AMOS G. HORNEY.